Dec. 3, 1968   W. KOCH ET AL   3,414,259
GRIPPER DEVICE FOR A SHEET FEEDER OF A PRINTING PRESS
Filed May 29, 1967   5 Sheets-Sheet 2

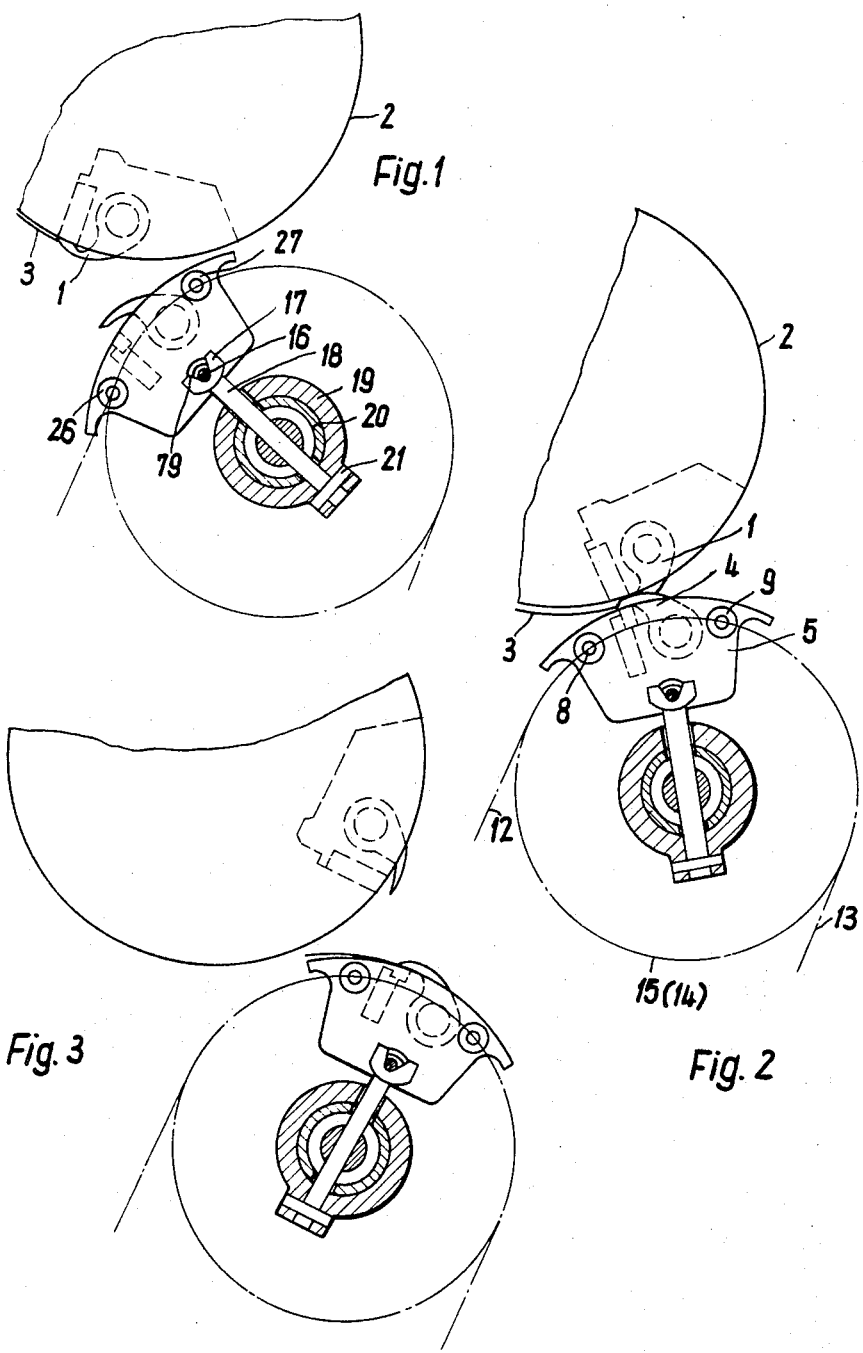

Inventors
WERNER KOCH
FRIEDRICH PREUSS
BY Hane and Nydick
Attorneys

Dec. 3, 1968    W. KOCH ET AL    3,414,259
GRIPPER DEVICE FOR A SHEET FEEDER OF A PRINTING PRESS
Filed May 29, 1967    5 Sheets-Sheet 4

Inventors
WERNER KOCH
FRIEDRICH PREUSS
BY Hume and Nydick
Attorneys 3,414,259
GRIPPER DEVICE FOR A SHEET FEEDER OF
A PRINTING PRESS
Werner Koch, Gotzenhain, and Friedrich Preuss, Neu-Isenburg, Germany, assignors to Roland Offsetmaschinenfabrik Faber & Schleicher A.G., Offenbach am Main, Germany, a firm
Filed May 29, 1967, Ser. No. 642,080
Claims priority, application Germany, June 1, 1966, R 43,383
7 Claims. (Cl. 271—82)

ABSTRACT OF THE DISCLOSURE

A gripper device for a sheet feeder of a printing press which adapts itself automatically to different paper gauges by limiting the gripper movement to a predetermined angle and by arresting the gripper rests at a predetermined level in reference to the sheet feeder. Such arrests of the gripper rests is automatically released upon completion of a gripping operation and automatically restored before the beginning of a new gripping operation.

Specification

The invention relates to a gripper device for coaction with a sheet feeding device and more particularly for a coaction with a sheet feeding device in which a sheet is gripped by the coaction of grippers on one side of a sheet to be gripped with gripper rests on the other side of the sheet, said grippers and gripper rests being movable in reference to each other to move the same into and out of a gripping position.

Sheet feeding devices of the general kind above referred to are used, for instance, as preliminary grippers or pick-up devices for sheet printing presses or as intermediate feeding devices for multiple color printing presses. The preliminary gripper device transfers a sheet to be fed from the feed table to the impression cylinder of the press while a pick-up device transfers the sheet from the impression cylinder to a stack. Intermediate sheet feeding devices transfer the sheets from the impression cylinder of one printing assembly of the press to the impression cylinder of a successive printing assembly. At the moment of transfer or reception, a sheet is in contact on one side of its leading edge with the surface of the impression cylinder and on its other side with gripper rests of the respective sheet feeding device. When a sheet is to be taken over by a preliminary gripping device from a feed table the surface of the feed table rather than the surface of the impression cylinder is the one which is in contact with the leading edge of said one side of the sheet at the moment the transfer from the table to the gripper device is effected.

With all the afore indicated operational conditions the different gauges of the paper to be handled must be taken into account. Sheet feeding devices as heretofore known for the purpose are equipped with means for adjusting the gripper rests in the direction vertical to the paper surface so that the spacing between the cylinder surface and the gripper rests present at the moment of the receipt or transfer of a sheet can be set in accordance with the gauge of the paper. Setting of adjustment means of this kind requires rather considerable periods of time for which the entire operation must be stopped. Furthermore, manual adjustment introduces the human error factor. The disadvantages of adjustment means for adjusting the gripper rests as heretofore known are particularly significant for the intermediate feeder devices as used in connection with multiple color printing presses.

It has been proposed to eliminate the adjustability of the gripper rests and to select a spacing between the cylinder surface and the gripper rests which is sufficiently large to accommodate even the heaviest gauges of paper to be handled. However, such short-cut tends to cause unacceptable stretching of the sheet material at the moment of the transfer, especially when thin sheets are used.

There are also known sheet feeding devices in which the sheets are gripped by grippers and counter grippers which are hinged or pivotal in reference to the sheet feeding device proper. For instance, German Patent 1,014,558 describes a device of this kind in which the gripping surface is at the level of the surface of the impression cylinder at the moment of transfer of a sheet. It is crucial that such location of the gripping surface is maintained to assure a correctly aligned transfer. According to the German patent the correct locating is obtained by a stop member such as a dog against which the gripper abuts when it is in its gripping position. A correct function of the known device requires that the gripper in reference to the counter gripper is so controlled that the gripper first becomes engaged with the stop member and that then the counter gripper moves into the gripping position. Due to the afore-pointed out crucial requirement that a sheet is transferred when the gripping surface and the cylinder surface occupy the same level at a definite moment of time, the period of time which is available for controlling the counter gripper so that it is moved subsequent to the gripper is bound to be a very short one. The resulting required rapid movement of the counter gripper causes serious structural and functional problems especially when the sheet feeding device is to be used in conjunction with high speed printing presses. The forces of acceleration become very high and the resulting hard impacts against the counter gripper due to the reaction forces, cause high wear and tear on the components of the device. Moreover, the additional bearing required for the counter gripper is continuously functioning during operation and it is difficult to protect the bearing against the ingress of dust. As a result, it is worn rather rapidly which causes increased maintenance costs and also introduces a pronounced factor of uncertainity as to the accuracy of the transfer of sheets.

It is a broad object of the invention to provide a novel and improved gripper device of the general kind above referred to which adapts itself automatically to different paper gauges and which is free of the afore-pointed out disadvantages of gripper devices as heretofore known.

According to the invention a stop or limit means which is movable into and out of an active position, limits the movement of the grippers and simultaneously therewith the displacement of the gripper surfaces of movable gripper rests and also of a sheet held between the grippers and the gripper rests against a continuously acting directional force in the direction for gripping action so that the gripping surfaces are at the predetermined level in reference to the sheet feeder of the printing press. The gripper device according to the invention further comprises means for arresting the gripper rests in the displaced position and also control means for moving the lock or limit means out of the active position when the gripper rests are arrested at the predetermined level. As a result, the gripper rests are retained in a position such that the gap for instance, between the peripheral surface of a cylinder of the press and the gripper rests, has in accordance with the gauge of the paper sheets to be fed a width such that the sheets can slide between the grippers and the gripper rests but is not wide enough to cause a stretching of the leading margin of the sheets when the same are transferred. The gripper rests remain arrested as the operational cycle continues so that the bearings of the device are not subjected to wear and tear. In other words, the gripping device operates in the manner of a conventional and generally satisfactory gripping device after completion of the setting and arresting of the gripper rests in accordance with the invention.

The automatic setting of the gripper rests occurs considerably faster than was heretofore possible so that the device of the invention is time saving. The device has further the advantage that the operator can effect setting of the gripper rests without knowing the actual gauge of the sheets and no malfunctions or faults are likely to occur due to negligence or lack of knowledge of the operator.

In a gripper device of the kind in which a plurality of springy grippers are mounted on a common gripper shaft and the turning of the gripper shaft in the direction for closing the gripper device is positively fixed by limit or stop means, the invention effects an automatic adjustment of the device in accordance with a specific paper gauge by providing a counter stop or limit means coacting with the afore-mentioned stop or limit means. This counter stop means is mounted on the gripper shaft and becomes effective before the turning of the gripper shaft is arrested. Both, the stop means and the counter stop means may be adjustable, or only one of these means. An adjustability of the stop or limit means has the advantage that any inaccuracies occurring during manufacture or caused by wear can be compensated.

The invention also provides that the stop means is moved into its active position by a control means against a continuously acting directional force such as a spring and is positively retained in this position by engagement with the counter stop means or frictionally by the friction between the engaging surfaces of the two stop means. This has the advantage that the stop means is biased to remain outside its active position and is hence not likely to move accidentally into its active position. Moreover, the retention of the stop by the counter stop means, either positively or frictionally, permits a return or release of the control means actuating the stop means prior to the completion of the operation.

Further savings can be effected in accordance with the invention by using a single control means for arresting the gripper rests and actuating the stop means. Retention of the gripper rests can be positively effected by clamping with suitable wedges or pressure in bearings and it can also be frictionally or form locking effected.

The control of the several operations during an operational cycle can be effected in a well understood and conventional manner by mechanical, pneumatic, hydraulic or electrical systems. Combinations of such control systems can, of course, also be used.

In the accompanying drawing an embodiment of the invention is shown by way of illustration and not by way of limitation.

In the drawings:

FIG. 1 is a diagrammatic view of a gripper device showing a gripper of an impression cylinder in the position prior to accepting a sheet;

FIG. 2 is a view similar to FIG. 1 but showing the gripper in the position during acceptance of a sheet;

FIG. 3 is a view similar to FIGS. 1 and 2 but showing the gripper in the position after acceptance of a sheet;

Figure 4:
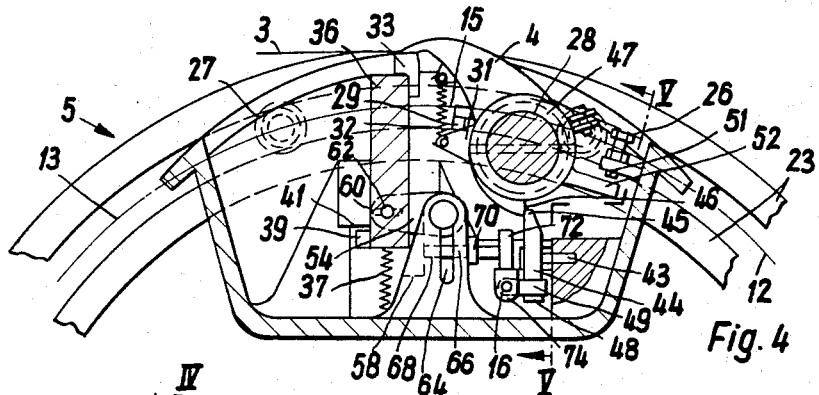
FIG. 4 is a sectional view of the gripper device taken on line IV—IV of FIG. 5.

Referring now to the figures in detail, and first to FIG. 2, according to this figure a sheet 3 gripped by a gripper 1 of an impression cylinder 2 is transferred to a gripper 4 of a gripper device according to the invention. The gripper device further comprises a carrier 5 fixedly mounting lugs 6, 7, 8 and 9 which, in turn, are secured to endless chains 10, 11, 12 and 13. These chains and thus also carrier 5, are driven by means of sprocket gears 14 and 15. When carrier 5 approaches a transfer position (FIG. 1), a pull rod 16, the function of which will be more fully explained hereinafter, engages a fork 17 of a lever 18. This lever is pivotal on a pin 21 which, in turn, is supported by a sleeve 19 fixedly seated on a hollow shaft 20. As can best be seen in FIG. 5, gripper carrier 5 is guided in guides 22 and 23 along which roll rollers 24, 25, 26 and 27 mounted on lugs 6, 7, 8 and 9 respectively. A gripper shaft 28 is journalled in the side walls of carrier 5 and rotatably seats a plurality of spring loaded grippers 4. Rotation of these grippers is positively limited by a nose 29 of a clamping member 31 and also tensionally by a tension spring 32 disposed between the gripper and clamping member 31.

Figure 5:
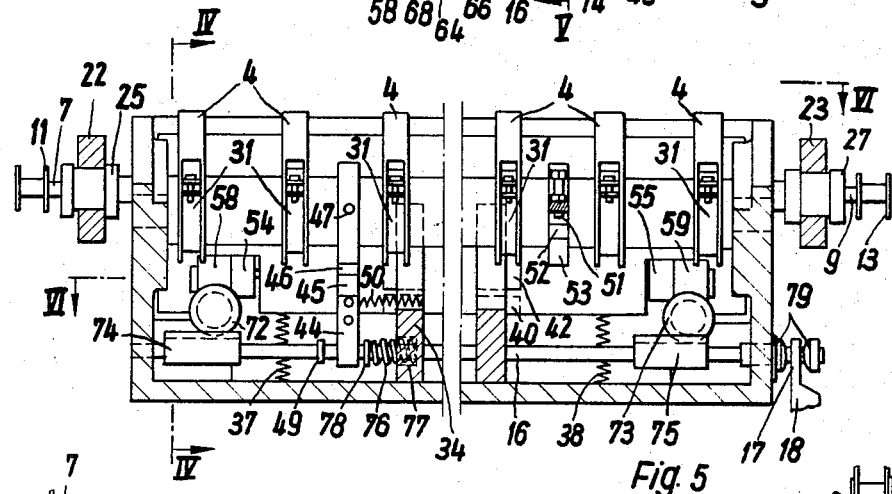
FIG. 5 is a section of the gripper device taken on line V—V of FIG. 4.

Rotation of the gripper shaft in counter-clockwise direction turns the grippers into the closing position whereby the gripper surfaces move into engagement with gripper rests 33. As a result, a support bar 36 for the gripper rests, which is slidably guided in blocks 34 and 35 and also in the side walls of carrier 5, is pressed down (see FIG. 6). Bar 36 is normally held at its lugs 39 and 40 in engagement with protrusions 41 and 42 on blocks 34, 35 respectively, by the action of pressure springs 37 and 38. The rotational angle of the gripper shaft and hence the distance of displacement of bar 36 are limited by a two-armed lever 44 which is pivotal about a pivot 43 fixedly mounted in carrier 5. One end of lever 44 forms a stop member 45 which coacts with a counter nose 46 on an abutment member 47 keyed, pinned or otherwise fixedly secured to gripper shaft 28 (see FIG. 5). The other end 48 of lever 44 extends into the path of movement of a lever 49 secured to pull rod 16. As shown in FIG. 5, a tension spring 50 biases lever 44 in clockwise direction and thus out of the range of coaction with nose 46 while lever 49 seeks to pivot lever 44 in counter-clockwise direction when rod 16 is displaced toward the right.

Stop member 45 is retained by counter nose 46 against the action of spring 50. However, it is also possible to provide a protrusion 46a on counter nose 46 (see FIGS.

19 and 20) for positively retaining stop member 45 in engagement with nose 46.

In the event stop member 45 is positioned outside the range of action of nose 46, the angular rotation of the gripper shaft 28 in the direction for closing the grippers is limited by a limit member 51 (see FIG. 4) adjustably mounted on carrier 5. This limit member is engageable with an arm 52 of an abutment member 53 (see FIG. 6) fixedly mounted on gripper shaft 28.

Figure 6:
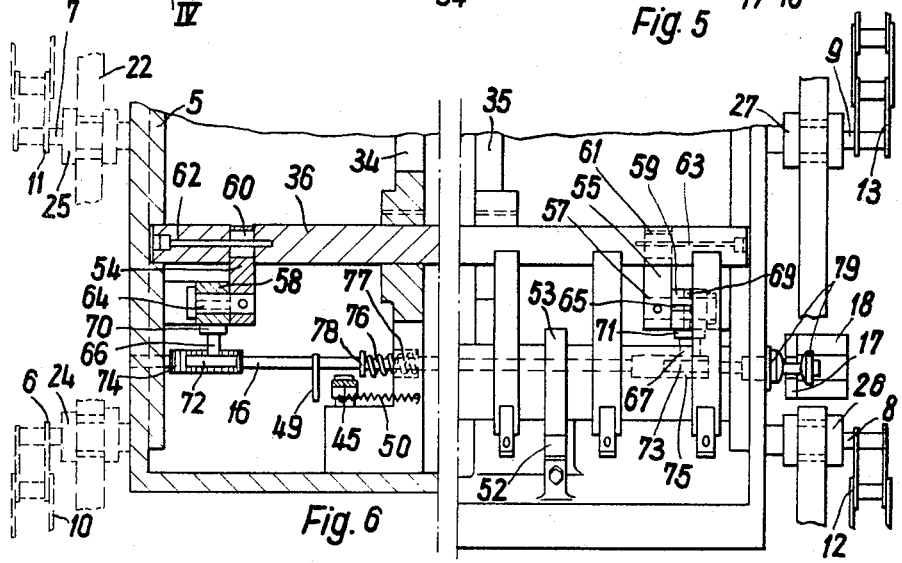
FIG. 6 is a plan view of the gripper device, partly taken in section along line VI—VI of FIG. 5.

Bar 36 is supported by arms 54 and 55. One end of each of these arms is pivotally mounted in blocks 58 and 59 respectively, by means of pins 56 and 57 fixedly secured to the arms. The other ends of the arms have elongated slots 60 and 61 respectively, through which protrude bolts 62 and 63 respectively, secured to bar 36 (see FIG. 4). Pins 56 and 57 and thus also bar 36 can be clamped in position by reducing the width of slots 64 and 65 in blocks 58 and 59 respectively. Such reduction in the width of the slots may be effected by spindles 66 and 67 threaded into threaded inserts 68 and 69 respectively, in blocks 58 and 59. As a result of such turning of the spindles, collars 70 and 71 on the spindles compress slots 64 and 65. The spindles may be turned by means of pinions 72 and 73 on the spindles. These pinions are in engagement with racks 74 and 75 and the racks are fixedly secured to push rod 16 (FIG. 16) which, in turn, is lengthwise displaceable in the side walls of carrier 5 and in blocks 34 and 35 (see FIG. 6). As previously stated, rod 16 also mounts lever 49 for actuating lever 44. A pressure spring 76 guided in a bore 77 of block 34 and abutting against the base of the bore presses against a collar 78 on push rod 16 thereby biasing the same toward the left as shown in FIG. 6. As is evident, displacement of rod 16 toward the left causes clamping of bar 36.

Figure 15:
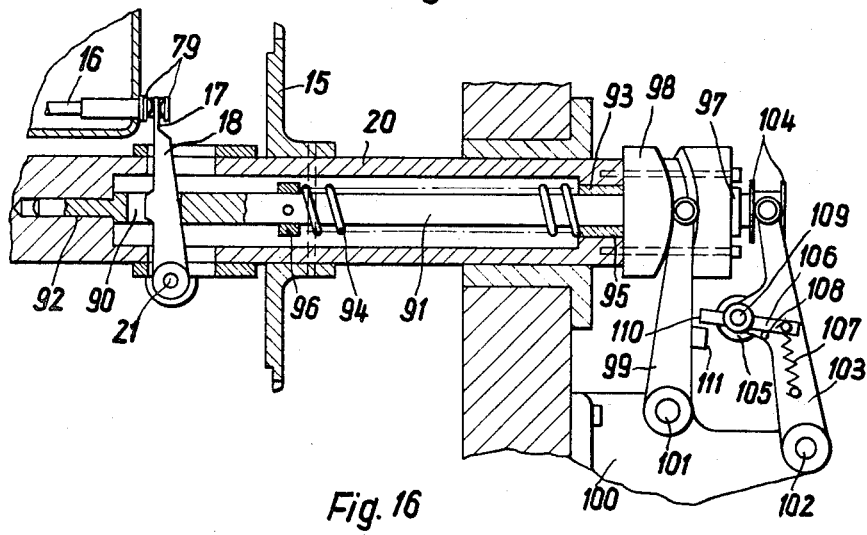
FIG. 15 is a sectional view of the control means for controlling the gripping opeartion during normal operation, the control means being shown in its idle position.

Displacement of rod 16 toward the right, effects a release of bar 36 by means of lever 18 the fork 17 of which acts upon a dog 79 secured to rod 16. Lever 18 which is pivotal about its bearing pin 21 as previously described (see FIG. 15) protrudes through a slot 90 in a bar 91 which is mounted lengthwise displaceable in hollow shaft 20 and is supported therein at two bearing points 92 and 93. A pressure spring 94 abuts on one end against a bushing 95 fixedly secured on shaft 20 and on the other end against a collar 96 fixedly secured on bar 91 for instance, by a pin. Spring 94 biases bar 91 continuously toward its left hand end position in which a collar 97 on bar 91 abuts against the cam surface of a cam or tumble disc 98 fixedly secured on shaft 20 for instance, by a screw connection. The cam surface of cam disc 98 when rotating causes a reciprocating movement of a cam follower 99 pivotal about a pin 101 supported by a bracket or casing 100. A second cam follower 103 pivotal about a pin 102 also supported by casing or bracket 100 engages a guide 104 at the right hand end of bar 91. Follower 103 mounts intermediate its length a rotary magnet 105 the armature of which is in the form of a two-arm lever 106. This lever is turned clockwise by a tension spring 107 attached to one arm of the lever until said arm engages a stop 108 and is turned counter-clockwise in accordance with the length of the stroke of the magnet when the magnet-coil of magnet 105 is energized. The rotary magnet and more specifically, the lever 106 thereof, are rotatable about a pivot 109. The other arm of lever 106 constitutes a catch 110 which is movable into and out of engagement with a protrusion 111 on follower 99. Accordingly, a pivotal movement of follower 99 in clockwise direction when the magnet is energized is transmitted to follower 103 and thus causes a displacement of bar 91 toward the right. The extent of such displacement is obviously controlled by the configuration of the cam surface of cam disc 98 and the selected proportions of the several coacting levers.

Figure 16:
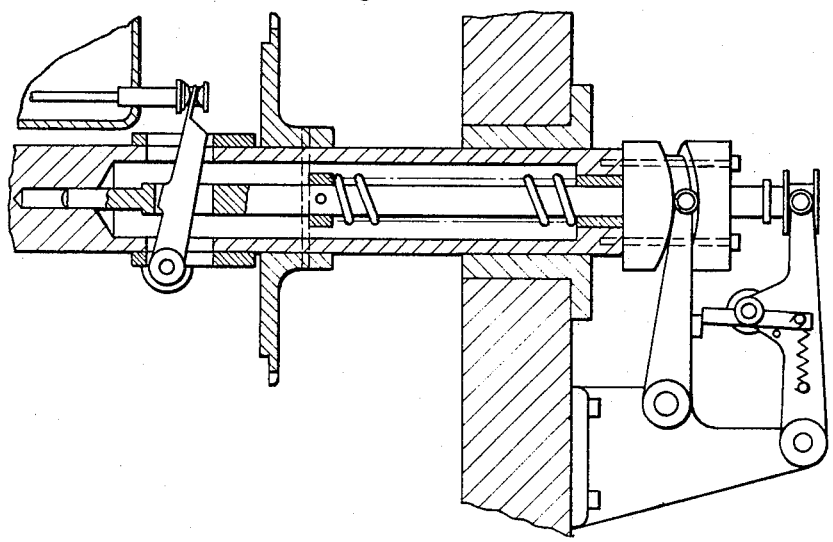
FIG. 16 is similar to FIG. 15, but showing the position of the control means in response to a change in the gauge of the paper sheets.
Figure 17:
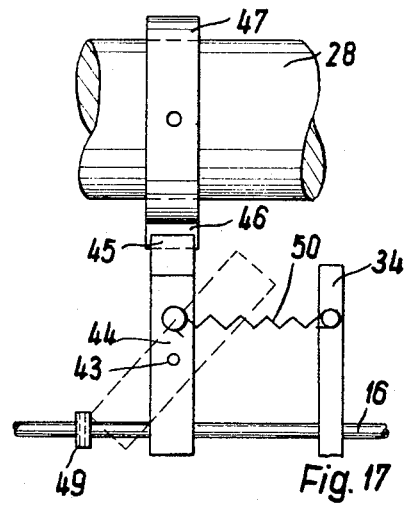
FIG. 17 shows the stop or limit means of the invention arranged for self-locking.
Figure 18:
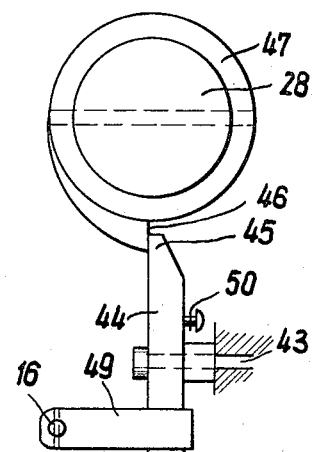
FIG. 18 is a side view of FIG. 17.
Figure 19:
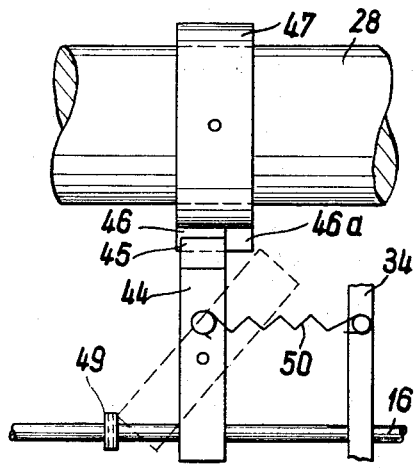
FIG. 19 shows a positively self-locking stop or limit means according to the invention.
Figure 20:
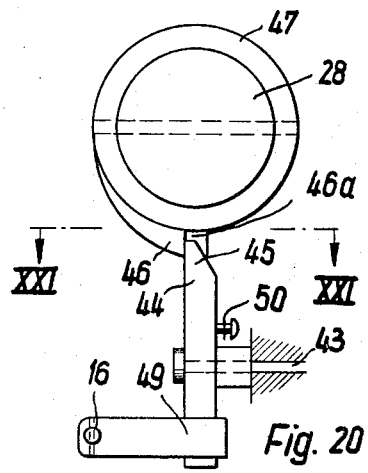
FIG. 20 is a side view of FIG. 19.
Figure 21:
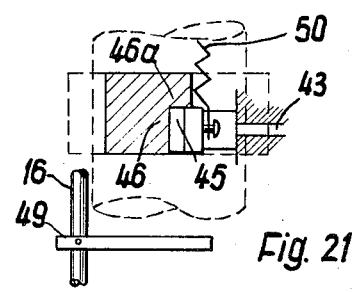
FIG. 21 is a section taken on line XXI—XXI of FIG. 20.

The sequence of a gripping cycle of the gripper device for a given paper gauge is as follows:

(1) When the dog 70 has engaged fork 17 of lever 18 (see FIG. 1) rotary magnet 105 (see FIG. 16) is energized thereby moving catch 110 on lever 106 within the range of engagement with protrusion 111 (see FIG. 16).

Figure 7:
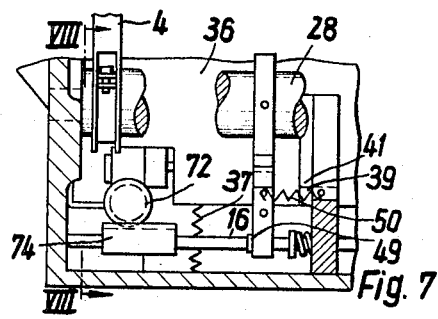
FIG. 7 is a fragmentary sectional view of the gripper device, the gripper being shown open in its open position without coacting with a sheet.
Figure 8:
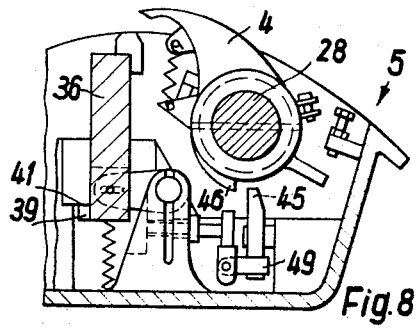
FIG. 8 is a section taken on line VIII—VIII of FIG. 7.

(2) Gripper shaft 28 is turned in a conventional manner so that grippers 4 are in the open position. Bar 36 is now released by means of the control assembly described in connection with FIGS. 15 and 16. Accordingly, the bar is free to be moved by spring action into its uppermost position in which lug 39 abuts against protrusion 41. Simultaneously, stop member 45 is moved into its operational position (see FIGS. 7 and 8).

Figure 9:
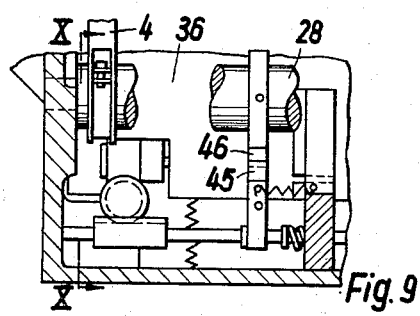
FIG. 9 is a fragmentary section of the gripper device, the gripper being shown in its gripping position and coacting with a sheet and a gripper rest bar being shown in a depressed position.
Figure 10:
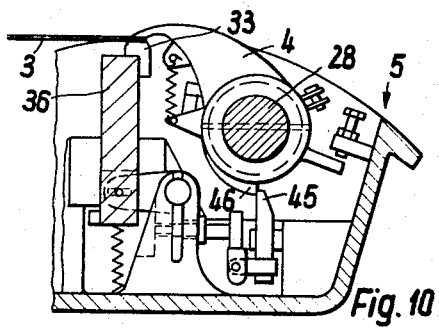
FIG. 10 is a section taken on line X—X of FIG. 9.

(3) When sheet 3 has moved within the reach of grippers 4, gripper shaft 28 is turned in a conventional manner into the direction for closing the grippers until counter nose 46 on shaft 28 engages stop member 45. The gripping surfaces of the grippers now press down bar 36 and also sheet 3 (see FIGS. 9 and 10).

Figure 11:
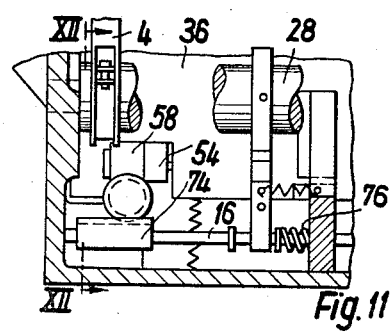
FIG. 11 is a fragmentary section of the gripper device, the gripper being closed gripping a sheet and the gripper rest bar being depressed and clamped in position.
Figure 12:
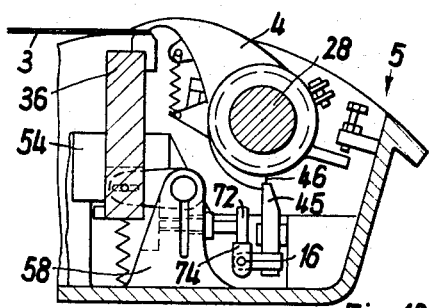
FIG. 12 is a fragmentary section taken on line XII—XII of FIG. 11.

(4) Clamping bar 36 (see FIGS. 11 and 12) is effected either by a displacement of bar 91 toward the left by the action of spring 94, the camming surface of cam disc 98 permitting such displacement (see FIG. 16), or by movement of dog 79 out of its position in the fork 17 of lever 18 whereupon a lengthwise displacement of bar 16 by pressure spring 76 becomes possible.

Figure 13:
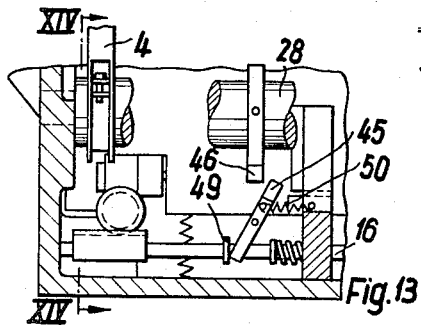
FIG. 13 is a sectional view similar to FIG. 11 but showing the stop or limit means out of engagement.
Figure 14:
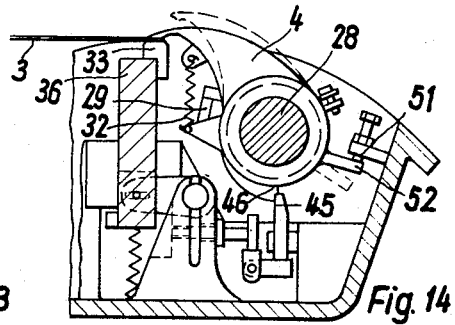
FIG. 14 is a fragmentary sectional view taken on line XIV—XIV of FIG. 13 showing in dotted lines the gripper position in which the stop or limit means is released.

(5) During the next opening of the grippers (see the dotted gripper positions as shown in FIG. 14) stop 45 previously held by nose 46 is released and pulled by spring 50 out of its range of action. As a result, the angle of rotation of the gripper shaft is now controlled by stop 51 for the subsequent gripper closing steps. However, since the pivotal movement of grippers 4 is already limited by the previously arrested gripper rests 33, protrusion 29 of clamping member 31 secured to the gripper shaft lifts itself against the action of spring 32 from engagement with grippers 4 whereby the required gripping pressure is produced (see FIGS. 13 and 14).

What is claimed is:

1. A gripper device of a sheet feeding device, said gripper device comprising in combination a rotatable cylinder, said cylinder having:
    a plurality of grippers and movably mounted thereon a plurality of gripper rests arranged to coact to grip a sheet therebetween;
    directional force means acting upon the gripper rests to bias the same into a gripping position;
    an abutment member movable into and out of an active position, said abutment member in its active position limiting movement of the grippers and also movement of the gripper rests with a gripped sheet therebetween against the action of the directional force means in the direction for a gripping action to a position such that gripping surfaces of the gripping rests are at a predetermined level in reference to the sheet feeding device;
    means for moving said abutment member into its active position;
    locking means for locking the displaced gripper rests in the displaced position; and
    control means coacting with said abutment member for moving the same out of its active position upon locking of the gripper rests in said displaced position.

2. A gripper device according to claim 1 and comprising a rotatable gripper shaft, said grippers being mounted on said gripper shaft with spring loading, stop means positively limiting rotation of the gripper shaft to an angular position in which the grippers are in the gripping position, a second abutment member mounted on the gripper shaft and coacting with said first abutment member, said first abutment member effecting limitation of the displacement of the grippers and the gripper rests prior to the coaction of the abutment member with the second abutment member.

3. A gripper device according to claim 2, wherein either one of said abutment members is adjustable.

4. A gripper device according to claim 2, wherein both said abutment members are adjustable.

5. A gripper device according to claim 2 and comprising second directional force means biasing said first abutment member out of its active position, and a control member for moving said first abutment member into its active position against the action of said second directional force means, said second abutment member holding the first abutment member in the active position.

6. A gripper device according to claim 2 and comprising a second directional force means biasing said first abutment member out of its active position, and a control member for moving said first abutment member into its active position, said second abutment member retaining said first abutment member in its active position by the pressure between the engaging surfaces of the abutment members.

7. A gripper device according to claim 1, wherein a common control member locks said gripper rests at said predetermined level and said abutment member in said displaced position.

References Cited

UNITED STATES PATENTS

| | | | |
|---|---|---|---|
| 1,572,710 | 2/1926 | Finkhaus | 101—410 |
| 2,935,937 | 5/1960 | Rossetto | 101—409 |

RICHARD E. AEGERTER, *Primary Examiner*.